(12) United States Patent
Zhou

(10) Patent No.: US 12,659,390 B2
(45) Date of Patent: Jun. 16, 2026

(54) HOUSING ASSEMBLY, CONTROL METHOD AND ELECTRONIC DEVICE

(71) Applicant: VIVO MOBILE COMMUNICATION CO., LTD., Dongguan (CN)

(72) Inventor: Pan Zhou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 276 days.

(21) Appl. No.: 18/633,822

(22) Filed: Apr. 12, 2024

(65) Prior Publication Data

US 2024/0259484 A1 Aug. 1, 2024

Related U.S. Application Data

(63) Continuation of application No. PCT/CN2022/123923, filed on Oct. 8, 2022.

(30) Foreign Application Priority Data

Oct. 14, 2021 (CN) .......................... 202111197711.9

(51) Int. Cl.
 H04M 1/02 (2006.01)
(52) U.S. Cl.
 CPC ................................. H04M 1/0216 (2013.01)
(58) Field of Classification Search
 CPC .... H04M 1/02; H04M 1/0206; H04M 1/0208; H04M 1/021; H04M 1/0214; H04M 1/0216; H04M 1/022; H04M 1/0225; H04M 1/0227; H04M 1/0233; H04M 1/0249; H04M 1/026; H04M 1/0266; H04M 1/0268; G06F 1/16; G06F 1/1601; G06F 1/1615; G06F 1/1616; G06F 1/1637; G06F 1/1642; G06F 1/11675; G06F 1/1679
See application file for complete search history.

(56) References Cited

U.S. PATENT DOCUMENTS

| | | | | |
|---|---|---|---|---|
| 10,394,276 B2* | 8/2019 | Lin | ........................ | G06F 1/1616 |
| 10,601,967 B1* | 3/2020 | Harmon | .............. | H04M 1/0268 |
| 11,432,418 B2* | 8/2022 | Yoon | ..................... | H04M 1/026 |

(Continued)

FOREIGN PATENT DOCUMENTS

| | | |
|---|---|---|
| CN | 106527585 A | 3/2017 |
| CN | 112291395 A | 1/2021 |

(Continued)

*Primary Examiner* — Quochien B Vuong
(74) *Attorney, Agent, or Firm* — The Webb Law Firm

(57) ABSTRACT

A housing assembly includes at least two housings, a hinge, a linkage assembly, a locking assembly, a locking key, and a driving assembly. The at least two housings are connected through the hinge, and the at least two housings are able to rotate relative to the hinge. A first end of the linkage assembly is connected to the hinge, and a second end of the linkage assembly extends into the first housing and is movably connected to the first housing. In a case that the locking assembly is in a first state, the locking assembly is separated from the second end; and in a case that the locking assembly is in a second state, the locking assembly abuts against the second end. The driving assembly is connected to the locking key to drive, through the locking key, the locking assembly to switch between the first state and the second state.

20 Claims, 8 Drawing Sheets

(56)  References Cited

U.S. PATENT DOCUMENTS

| | | | | |
|---|---|---|---|---|
| 11,592,865 B2 * | 2/2023 | Moon | .................. | G06F 1/1618 |
| 2020/0413557 A1 | 12/2020 | Zhang | | |
| 2023/0315165 A1 | 10/2023 | Mao et al. | | |

FOREIGN PATENT DOCUMENTS

| CN | 112540650 A | 3/2021 |
|---|---|---|
| CN | 112797068 A | 5/2021 |
| CN | 112887460 A | 6/2021 |
| CN | 113179341 A | 7/2021 |
| CN | 113411439 A | 9/2021 |
| CN | 113422851 A | 9/2021 |
| CN | 113438349 A | 9/2021 |
| CN | 113790209 A | 12/2021 |
| CN | 113923283 A | 1/2022 |

* cited by examiner

HOUSING ASSEMBLY, CONTROL METHOD AND ELECTRONIC DEVICE

CROSS-REFERENCE TO RELATED APPLICATIONS

This application is a Bypass Continuation Applications of International Patent Application No. PCT/CN2022/123923, filed Oct. 8, 2022, and claims priority to Chinese Patent Application No. 202111197711.9, filed Oct. 14, 2021, the disclosures of which are hereby incorporated by reference in their entireties.

BACKGROUND OF THE INVENTION

Field of the Invention

This application pertains to the field of electronic device technologies, and in particular, to a housing assembly, a housing assembly control method, a housing assembly control system, an electronic device, and a non-transitory storage medium.

Description of Related Art

At present, in order to achieve better visual experience, screens of electronic devices are becoming increasingly larger. However, the increased screen size leads to a decrease in portability of the electronic devices.

Usually, to increase the screen size without compromising the portability of electronic devices, the screens of electronic devices are made foldable. However, during the use of an electronic device with a foldable screen, the lack of support for the screen after the screen is opened to a specific angle makes it difficult to keep the screen stable at that specific opening angle.

SUMMARY OF THE INVENTION

A first aspect of this application provides a housing assembly, including: at least two housings, a hinge, a linkage assembly, a locking assembly, a locking key, and a driving assembly. The at least two housings include a first housing. The at least two housings are connected through the hinge, and the at least two housings are able to rotate relative to the hinge. A first end of the linkage assembly is connected to the hinge, and a second end of the linkage assembly extends into the first housing and is movably connected to the first housing. The locking assembly is provided on the first housing and opposite the second end of the linkage assembly, the locking assembly having a first state and a second state. In a case that the locking assembly is in the first state, the locking assembly is separated from the second end of the linkage assembly; and in a case that the locking assembly is in the second state, the locking assembly abuts against the second end of the linkage assembly. The locking key is provided on the first housing and is in contact with the locking assembly. The driving assembly is connected to the locking key to drive, through the locking key, the locking assembly to switch between the first state and the second state.

A second aspect of this application provides a housing assembly control method, including: controlling, based on operation information of a locking key, a driving assembly to drive a locking assembly to switch to a first state; controlling at least two housings to move to a position corresponding to the operation information; and controlling the driving assembly to drive the locking assembly to switch to a second state.

A third aspect of this application provides a housing assembly control system, including a first switching unit, a control unit, and a second switching unit. The control system is configured to: control, based on operation information of a locking key, a driving assembly to drive a locking assembly to switch to a first state; control at least two housings to move to a position corresponding to the operation information; and control the driving assembly to drive the locking assembly to switch to a second state.

A fourth aspect of this application provides an electronic device, including a housing assembly according to any one of the foregoing technical solutions; or including a memory and a processor, where the memory is configured to store executable instructions, and the processor is configured to execute stored instructions to implement the steps of the housing assembly control method according to any one of the foregoing technical solutions.

A fifth aspect of the application further provides an electronic device, configured to perform the steps of the housing assembly control method according to the second aspect.

A sixth aspect of this application provides a non-transitory storage medium, where a computer program is stored and when the computer program is executed by a processor, the steps of the housing assembly control method according to any one of the foregoing technical solutions are implemented.

A seventh aspect of this application provides a computer program product, where the computer program is able to be executed by a processor to implement the steps of the housing assembly control method according to the second aspect.

An eighth aspect of this application provides a chip, where the chip includes a processor and a communication interface. The communication interface is coupled to the processor, and the processor is configured to run a program or instructions to implement the housing assembly control method according to the second aspect.

BRIEF DESCRIPTION OF THE DRAWINGS

The above and/or additional aspects and advantages of this application will become obvious and easy to understand from the description of the embodiments with reference to the following drawings.

Figure 1:
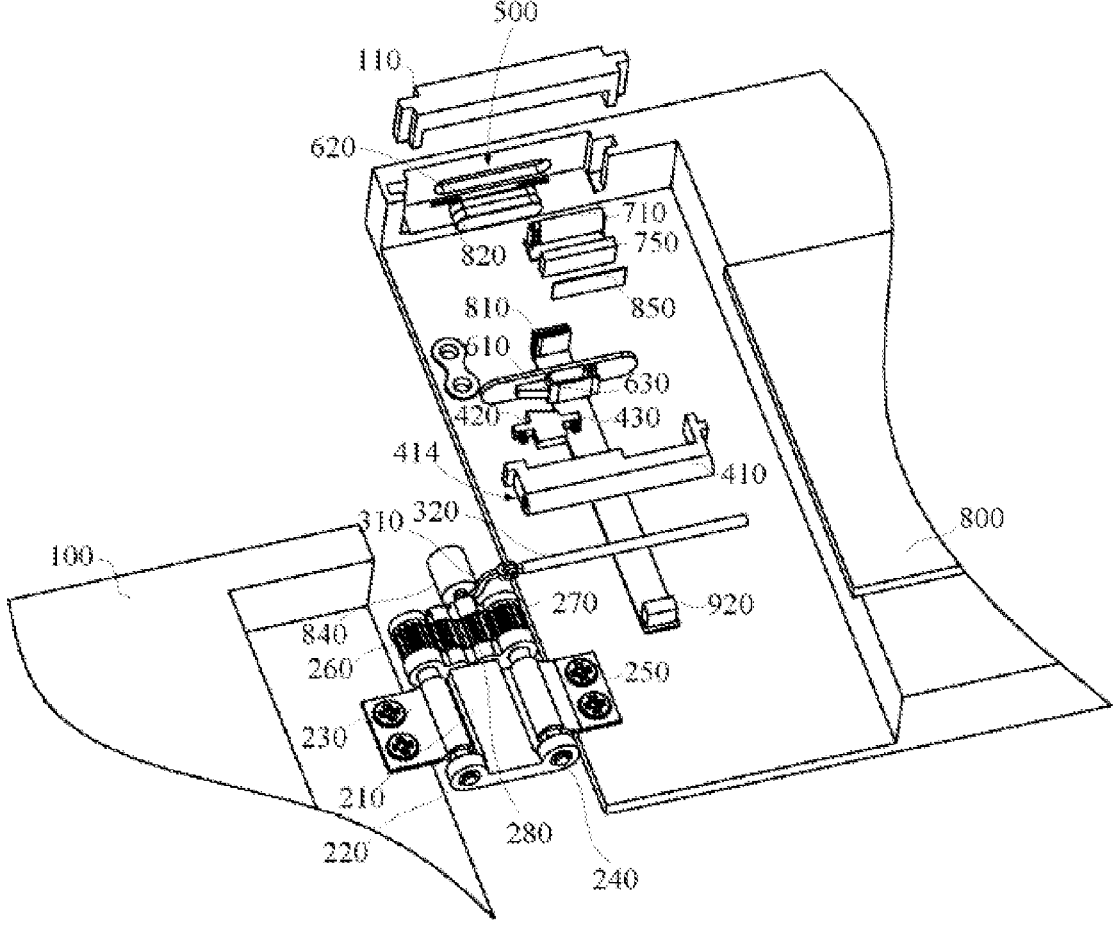
FIG. 1 is a first schematic structural diagram of a housing assembly according to an embodiment of this application.

The corresponding relationship between reference signs and part names in FIG. 1 to FIG. 8 is as follows:

100. housing, 110. key cover, 200. hinge, 210. hinge body, 220. first connecting shaft, 230. first connecting portion, 240. second connecting shaft, 250. second connecting portion, 260. first gear, 270. second gear, 280. third gear, 300. linkage assembly, 310. first connecting rod, 320. second connecting rod, 330. pin, 400. locking assembly, 410. bracket, 412. bracket body, 414. first sliding groove, 416. second sliding groove, 418. guiding hole, 419. fixing post, 420. slider, 422. slider body, 424. first guiding surface, 430. elastic member, 440. ball, 500. third sliding groove, 600. locking key, 610. locking key body, 620. toggle portion, 630. second guiding surface, 710 driving assembly, 720. piezo-electric component, 730. first electrode, 740. second electrode, 750. power storage component, 760. clamping component, 770. clamping groove, 780. mounting groove, 800. main board, 810. fingerprint circuit board, 820. fingerprint module, 830. piezoelectric circuit board, 840. driving motor, 850. double-sided adhesive tape, 860. fingerprint protection cover, 870. fingerprint sensor, 880. fingerprint key, 910. fingerprint circuit pad, and 920. fingerprint circuit board connector.

DESCRIPTION OF THE INVENTION

To more clearly understand the foregoing purposes, features, and advantages in this application, the following describes this application with reference to the accompanying drawings and embodiments. It should be noted that, in absence of conflicts, the embodiments and features in the embodiments in this application may be mutually combined.

The following description provides some embodiments to facilitate a thorough understanding of this application. However, it should be noted that this application can be implemented in other ways different from those described herein. Therefore, the scope of protection of this application is not limited to the embodiments disclosed below.

The following describes a housing assembly, a housing assembly control method, a housing assembly control system, an electronic device, and a non-transitory storage medium according to some embodiments of this application with reference to FIGS. 1 to 8.

This embodiment provides a housing assembly, as shown in FIGS. 1 to 8, including: at least two housings 100, a hinge 200, a linkage assembly 300, a locking assembly 400, a locking key 600, and a driving assembly 710. The at least two housings 100 include a first housing. The at least two housings 100 are connected through the hinge 200, and the at least two housings 100 are able to rotate relative to the hinge 200. A first end of the linkage assembly 300 is connected to the hinge 200, and a second end of the linkage assembly 300 extends into the first housing and is movably connected to the first housing. The locking assembly 400 is provided on the first housing and opposite the second end of the linkage assembly 300, the locking assembly 400 having a first state and a second state. In a case that the locking assembly 400 is in the first state, the locking assembly 400 is separated from the second end of the linkage assembly 300; and in a case that the locking assembly 400 is in the second state, the locking assembly 400 abuts against the second end of the linkage assembly 300. The locking key 600 is provided on the first housing and is in contact with the locking assembly 400. The driving assembly 710 is connected to the locking key 600 to drive, through the locking key 600, the locking assembly 400 to switch between the first state and the second state.

In this embodiment, the housing assembly includes at least two housings 100, a hinge 200, a linkage assembly 300, a locking assembly 400, a locking key 600, and a driving assembly 710. The locking key 600 is provided on the first housing and is in contact with the locking assembly 400. The driving assembly 710 is connected to the locking key 600 such that the driving assembly 710 can drive the locking key 600, which in turn drives the locking assembly 400 to switch between the first state and the second state. In a case that the locking assembly 400 is in the first state, the locking assembly 400 is separated from the second end of the linkage assembly 300, and the hinge 200 is able to rotate; and in a case that the locking assembly 400 is in the second state, the locking assembly 400 abuts against the second end of the linkage assembly 300. The second end of the linkage assembly 300 is stationary relative to the first housing to fix the hinge 200. Through the controlling of the state of the locking assembly 400, the purpose of locking and releasing the linkage assembly 300 is achieved. Locking the linkage assembly 300 stabilizes the opening angle of the first housing and in addition, the hinge 200 can be fixed through the linkage assembly 300, enabling the first housing to stably maintain a specific opening angle. This ensures that the screen of the electronic device stably remains at an opening angle, enhancing the stability of the housing 100 during electronic device usage and improving the user experience of the electronic device.

For example, the housing assembly includes at least two housings 100 and a hinge 200, and the at least two housings 100 are connected through the hinge 200, thereby making the at least two housings 100 rotatable relative to each other, and the at least two housings 100 are also rotatable relative to the hinge 200. The housing assembly further includes a linkage assembly 300 and a locking assembly 400. A first end of the linkage assembly 300 is connected to the hinge 200, and a second end of the linkage assembly 300 extends into the first housing and is movably connected to the first housing. The locking assembly 400 is provided on the first housing and can switch between a first state and a second state. In a case that the locking assembly 400 is in the first state, the locking assembly 400 is separated from the second end of the linkage assembly 300, and the hinge 200 rotates, allowing the second end of the linkage assembly 300 to be movably connected to the first housing, enabling the first housing to freely rotate relative to the hinge 200. In a case that the locking assembly 400 is in the second state, the locking assembly 400 abuts against the second end of the linkage assembly 300 and the second end of the linkage assembly 300 remains stationary relative to the first housing to fix the hinge 200 and maintain a specific angle between the first housing and the hinge 200. The housing assembly further includes a driving assembly 710, where the driving assembly 710 is installed in the sliding groove on the inner surface of the key cover 110 and is snap fitted at the corresponding position of the housing 100. The driving assembly 710 is securely connected to the locking key 600. Through the application of an electric field to both ends of the driving assembly 710, the driving assembly 710 undergoes expansion or contraction deformation. This deformation drives the movement of the locking key 600, which in turn drives the locking assembly 400 to switch between the first state and the second state.

In this embodiment, in the housing assembly provided in this application, the opening angle of the first housing can be limited through the linkage assembly 300. In addition, the first housing can be more stably maintained at that opening angle through the fixing of the hinge 200 by the linkage assembly 300. This ensures that the screen of the electronic device to be more stably maintained at that opening angle, enhancing the overall stability of the electronic device and improving the user experience of the electronic device. Furthermore, the state of the locking assembly 400 can be manually controlled using the locking key 600; or the driving assembly 710 can be used to drive the locking key 600, which in turn drives the locking assembly 400 to electrically switch between states. This enhances flexibility in usage and improves the user experience.

This embodiment provides a housing assembly. In addition to the technical features of the foregoing embodiments, this embodiment further includes the following technical features.

As shown in FIGS. 1 to 8, the driving assembly 710 includes: a piezoelectric component 720, a first electrode 730, a second electrode 740, and a power storage component 750. A first end of the piezoelectric component 720 is connected to the locking key 600. The first electrode 730 is provided between the first end of the piezoelectric component 720 and the locking key 600. The second electrode 740 is provided at a second end of the piezoelectric component 720. Two poles of the power storage component 750 are respectively connected to the first electrode 730 and the second electrode 740.

In this embodiment, the driving assembly 710 includes a piezoelectric component 720, a first electrode 730, and a second electrode 740. The first end of the piezoelectric component 720 is connected to the locking key 600. The first electrode 730 is provided between the first end of the piezoelectric component 720 and the locking key 600. The second electrode 740 is provided at the second end of the piezoelectric component 720. The driving assembly 710 further includes a power storage component 750. The power storage component 750 is adhered to the bracket 410 through a double-sided adhesive tape 850 and two poles of the power storage component 750 are respectively connected to the first electrode 730 and the second electrode 740. An electric field is applied to the first electrode 730 and the second electrode 740 through the power storage component 750, such that the electric field is applied to two ends of the piezoelectric component 720, causing the piezoelectric component 720 to mechanically deform under the action of the inverse piezoelectric effect, driving the locking key 600 to move to a designated position, and consequently driving the locking assembly 400 to move, thereby implementing the locking/unlocking function. Moreover, with the power storage component 750 configured, the piezoelectric component 720 can obtain stable driving power, thereby improving the operational stability and reliability of the piezoelectric component 720.

In an embodiment, a positive or negative voltage is applied to two ends of the piezoelectric component 720 by utilizing the inverse piezoelectric effect of the piezoelectric component 720, such that the piezoelectric component 720 is extended or compressed by a corresponding displacement amount, driving the locking key 600 to move to a designated position. As a result, the locking assembly 400 is driven to move, implementing the locking/unlocking function.

In an embodiment, the inverse piezoelectric effect refers to the phenomenon that when an electric field is applied in the polarization direction of dielectrics, these dielectrics will generate mechanical deformation or mechanical stress in a certain direction, and when the applied electric field is removed, this deformation or stress will also disappear. Using this principle, an electric field can be applied to the piezoelectric component 720 to make the piezoelectric component 720 to generate a mechanical deformation, thereby generating a force to drive the locking key 600 to move and achieving the effect of driving the locking assembly 400 to move.

In an embodiment, when the automatic locking/unlocking function of the folding screen is not used, the locking/unlocking action of the locking assembly 400 can be implemented by manually manipulating the locking key 600 to drive the locking assembly 400 to move. In this case, the piezoelectric effect of the piezoelectric component 720 can be used to charge the power storage component 750 and the battery of the mobile phone, thus realizing the conversion of mechanical energy to electric energy, improving the running time of the piezoelectric component 720, and reducing the energy consumption of the mobile phone.

This embodiment provides a housing assembly. In addition to the technical features of the foregoing embodiments, this embodiment further includes the following technical features.

As shown in FIGS. 1 to 8, the locking assembly 400 further includes a bracket 410 and a slider 420; where the bracket 410 is connected to the first housing; and the slider 420 is provided in the bracket 410 and is able to slide relative to the bracket 410, where the second end of the linkage assembly 300 is threaded through the bracket 410; in a case that the locking assembly 400 is in the first state, the slider 420 is in a second position and is separated from the second end of the linkage assembly 300; and in a case that the locking assembly 400 is in the second state, the slider 420 is in a first position and abuts against the second end of the linkage assembly 300.

In this embodiment, in this technical solution, the slider 420 is provided in the bracket 410 and is capable of sliding relative to the bracket 410. When the slider 420 slides to a first position of pressing against the linkage assembly 300, the linkage assembly 300 is fixed by the slider 420, and the linkage assembly 300 can be used to support the hinge 200 and the housing 100 connected to the bracket 410, thereby allowing the housing 100 to be at a certain angle with the hinge 200. When the slider 420 slides to a second position away from the linkage assembly 300, the slider 420 is not in contact with the linkage assembly 300, and the linkage assembly 300 is able to slide relative to the bracket 410, enabling the housing 100 connected to the bracket 410 to rotate freely relative to the hinge 200.

This embodiment provides a housing assembly. In addition to the technical features of the foregoing embodiments, this embodiment further includes the following technical features.

As shown in FIGS. 1 to 8, the bracket 410 includes: a bracket body 412, a first sliding groove 414, a second sliding groove 416, and a guiding hole 418; where the first sliding groove 414 is provided on the bracket body 412, and the linkage assembly 300 is threaded through the first sliding groove 414; the second sliding groove 416 is provided on the bracket body 412, communicatively connected to the first sliding groove 414, and is perpendicular to the first sliding groove 414, and the slider 420 is provided within the second sliding groove 416; and the guiding hole 418 is provided on the bracket body 412, along the sliding direction of the slider 420. The locking assembly 400 further includes an elastic member 430, where the elastic member 430 is provided within the guiding hole 418, with one end abutting against the bracket body 412 and another end abutting against slider 420.

In this embodiment, the bracket 410 includes a bracket body 412, where the bracket body 412 is provided with a first sliding groove 414 and a second sliding groove 416, the linkage assembly 300 is able to slide within the first sliding groove 414 and the slider 420 is able to slide within the second sliding groove 416. As the first sliding groove 414 is communicatively connected to the second sliding groove 416, the slider 420 can be in contact with the linkage assembly 300, and thus the fixation of the linkage assembly 300 can be realized by the friction between the slider 420 and the linkage assembly 300, such that the housing 100 can be at a certain angle with the hinge 200. The guiding hole 418 is provided on the bracket body 412 and in the sliding direction of the slider 420. An elastic member 430 is provided in the guiding hole 418, with one end abutting against the bracket body 412 and another end abutting against the slider 420, such that the slider 420 may move under the action of the elastic member 430, allowing the elastic member 430 to drive the slider 420 away from the linkage assembly 300. As a result, the slider 420 can automatically slide to the second position when restriction on it is released, making it more convenient for the user to operate the locking assembly 400.

Optionally, the sliding direction of the slider 420 is perpendicular to the sliding direction of the linkage assembly 300.

Optionally, the elastic member 430 is a spring. When the slider 420 is in the first position, the elastic member 430 is in a compressed state.

Optionally, the slider 420 is provided with a fixing post 419, and the elastic member 430 is sleeved on the fixing post 419 and is embedded in the guiding hole 418.

This embodiment provides a housing assembly. In addition to the technical features of the foregoing embodiments, this embodiment further includes the following technical features. As shown in FIGS. 1 to 8, the slider 420 includes a slider body 422 and a ball 440, one side of the slider body 422 is able to abut against the linkage assembly 300, and another side of the slider body 422 is provided with a first guiding surface 424, the first guiding surface 424 being inclined relative to the linkage assembly 300.

In this embodiment, the first guiding surface 424 is provided on another side of the slider body 422 and is inclined relative to the linkage assembly 300, therefore it is able to drive the slider 420 to move between the first position and the second position.

This embodiment provides a housing assembly. In addition to the technical features of the foregoing embodiments, this embodiment further includes the following technical features.

As shown in FIGS. 1 to 8, the housing assembly further includes: a third sliding groove 500, where the third sliding groove 500 is provided on one of the at least two housings 100, and the third sliding groove 500 is provided from the slider 420 to outside of one of the at least two housings 100 in a cut-through manner; where the locking key 600 is provided in the third sliding groove 500 and is in contact with the first guiding surface 424, at least a portion of the locking key 600 protrudes from an outer wall of one of the at least two housings 100, and the piezoelectric component 720 is able to drive the locking key 600 to slide in the third sliding groove 500, further driving the slider 420 to move between the first position and the second position.

In this embodiment, the locking key 600 is provided within the third sliding groove 500 and is in contact with the first guiding surface 424. Since the first guiding surface 424 is provided on another side of the slider body 422 and is inclined relative to the linkage assembly 300, while locking key 600 is sliding within the third sliding groove

500, it is able to drive the slider 420 to move between the first position and the second position. Moreover, through the controlling of the piezoelectric component 720 to drive the locking key 600 to slide in the third sliding groove 500, the electrical control of the movement of the locking key 600 is achieved, thereby enabling the user to use the locking key 600 to control, through specific control action commands, the slider 420 to lock or move away from the linkage assembly 300, enhancing the convenience of the locking assembly 400 during use. In addition, at least a portion of the locking key 600 protrudes from the outer wall of one of the at least two housings 100, which facilitates manual pushing of the locking key 600 by the user to implement manual adjustment of the position of the slider 420, providing users with a more flexible method for controlling the locking assembly 400 and making it more convenient to use.

In this embodiment, through the utilization of the inverse piezoelectric effect of the piezoelectric component 720 and control of the polarity of the electrodes, when a positive voltage is applied to the piezoelectric component 720, the piezoelectric component 720 elongates, and when a negative voltage is applied to the piezoelectric component 720, the piezoelectric component 720 contracts. This allows the movement of the locking key 600 to be driven by the length change of the piezoelectric component 720, thereby driving the locking assembly 400 to perform locking and unlocking actions.

In this embodiment, during manual control, after the user opens the housing 100 to an opening angle, the linkage assembly 300 moves to a corresponding position. When the user pushes the locking key 600, the locking key 600 pushes the slider 420 to move from the second position to the first position. Thus, the linkage assembly 300 is locked through the slider 420, making the housing 100 maintained at the opening angle. When the user needs to rotate the housing 100 and pushes the locking key 600, the locking key 600 no longer restricts the position of the slider 420. The slider 420 moves from the first position to the second position under the driving of the elastic member 430, releasing the linkage assembly 300 and allowing the housing 100 to be freely rotated according to the need of the user.

This embodiment provides a housing assembly. In addition to the technical features of the foregoing embodiments, this embodiment further includes the following technical features.

As shown in FIGS. 1 to 8, the locking key 600 includes a locking key body 610, a toggle portion 620, and a second guiding surface 630, where the toggle portion 620 is provided on a first side of the locking key body 610 and protrudes from the outer wall of one of the at least two housings 100; and the second guiding surface 630 is provided on a second side of the locking key body 610 and matches the first guiding surface 424.

In this embodiment, the locking key 600 includes the locking key body 610, the toggle portion 620, and the second guiding surface 630. The user may push the locking key body 610 through the toggle portion 620, thereby driving the second guiding surface 630 to move. The second guiding surface 630 matches the first guiding surface 424, such that the locking key body 610 may drive the first guiding surface 424 through the second guiding surface 630, thereby realizing the driving of the slider 420.

This embodiment provides a housing assembly. In addition to the technical features of the foregoing embodiments, this embodiment further includes the following technical features.

As shown in FIGS. 1 to 8, the driving assembly 710 further includes a clamping component 760 and a piezoelectric circuit board 830, where the clamping component 760 is connected to the first end of the piezoelectric component 720; the locking key body 610 is provided with a clamping groove 770, and the clamping component 760 is clamped in the clamping groove 770; and the piezoelectric circuit board 830 is provided on the piezoelectric component 720, and is electrically connected to the fingerprint circuit board 810.

In this embodiment, the driving assembly 710 includes a clamping component 760, where the clamping component 760 is connected to the first end of the piezoelectric component 720, and a clamping groove 770 is provided on the locking key body 610, the clamping component 760 being clamped into the clamping groove 770. In this application, one end of the piezoelectric component 720 is connected to the clamping component 760, and the clamping component 760 is securely fixed to the piezoelectric component 720 and moves with the telescoping action of the piezoelectric component 720. Through the clamping of the clamping component 760 within the clamping groove 770 provided on the locking key body 610, driving the movement of the clamping component 760 through the telescoping action of the piezoelectric component 720 is implemented. The movement of the clamping component 760 then drives the movement of the locking key body 610, thereby realizing the effect of driving the locking assembly 400 through the locking key 600 and realizing the locking/unlocking effect of the locking assembly 400. The driving assembly 710 further includes a piezoelectric circuit board 830, where the piezoelectric circuit board 830 is provided on the piezoelectric component 720, and is electrically connected to the fingerprint circuit board 810. Since the fingerprint circuit board 810 is electrically connected to the main board 800, electrically connecting the piezoelectric circuit board 830 to the fingerprint circuit board 810 implements an electrical connection between the piezoelectric circuit board 830 and the main board 800. This allows the locking and unlocking action command signals issued by the main board 800 to be transferred to the piezoelectric circuit board 830 through the fingerprint circuit board 810, realizing the electric control of the driving assembly 710. Furthermore, through this connection, the electric energy generated by the piezoelectric component 720 through the piezoelectric effect can be transferred to the mobile phone battery, so as to implement charging of the mobile phone battery, improving the battery life of the mobile phone, and enhancing the user experience.

This embodiment provides a housing assembly. In addition to the technical features of the foregoing embodiments, this embodiment further includes the following technical features.

As shown in FIGS. 1 to 8, the first electrode 730 is provided in the clamping groove 770 and located between the clamping component 760 and the locking key body 610.

In this embodiment, the first electrode 730 is provided in the clamping groove 770 and located between the clamping component 760 and the locking key body 610. Since the clamping component 760 is securely connected to the piezoelectric component 720, the electrical energy can be transferred to the clamping component 760 through the first electrode 730, and then the electrical energy can be transferred to one end of the piezoelectric component 720 through the clamping component 760, realizing the effect of applying voltage to that end of the piezoelectric component 720.

This embodiment provides a housing assembly. In addition to the technical features of the foregoing embodiments, this embodiment further includes the following technical features.

Figure 7:
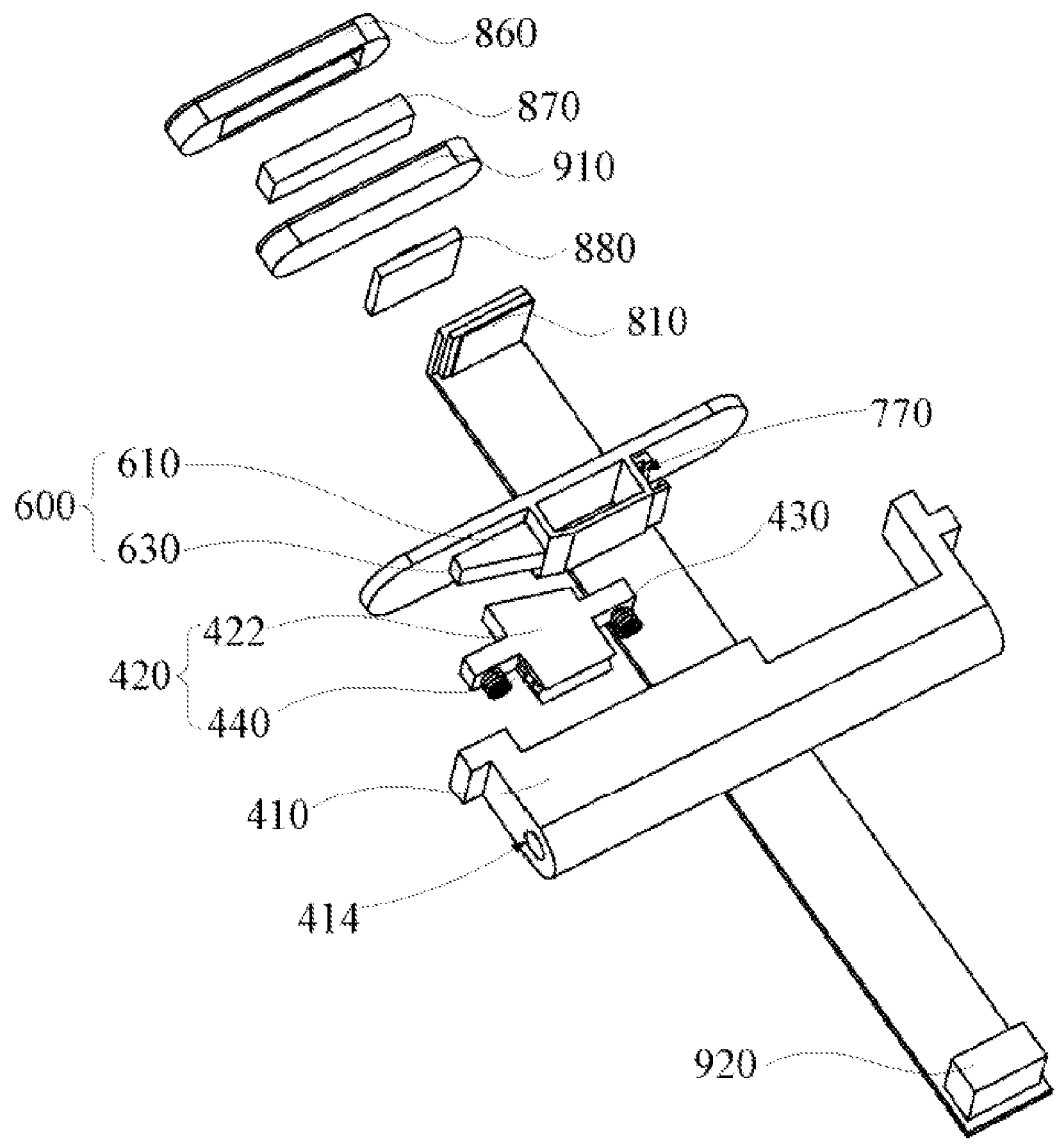
FIG. 7 is a schematic structural diagram of a fingerprint module according to an embodiment of this application.

As shown in FIGS. 1 and 7, the locking key body 610 is provided with a mounting groove 780, and the locking key 600 further includes a fingerprint circuit board 810 and a fingerprint module 820; where the fingerprint circuit board 810 is provided in the mounting groove 780; and the fingerprint module 820 is provided at the toggle portion 620 and corresponds to the fingerprint circuit board 810.

In this embodiment, the locking key 600 further includes the fingerprint circuit board 810 and the fingerprint module 820, and the locking key body 610 is provided with the mounting groove 780. The fingerprint circuit board 810 can be adhered into the mounting groove 780 on the locking key body 610, and the fingerprint module 820 is provided at the toggle portion 620 and corresponds to the fingerprint circuit board 810. Through the fingerprint module 820, a scanning and collection of the user fingerprint information is implemented. The collected data is transferred to the processor through the fingerprint circuit board 810, realizing the identification of the user information through the fingerprint information, and improving the security of the device. Furthermore, providing the fingerprint circuit board 810 and the fingerprint module 820 on the locking key 600 eliminates the need to set up a separate area for arranging the fingerprint module 820. This simplifies the design complexity, improves the overall aesthetics, enhances user convenience, and improves the user experience.

In this embodiment, the fingerprint module 820 includes a fingerprint protection cover 860, a fingerprint sensor 870, a fingerprint key (fingerprint DOME key) 880, and a fingerprint circuit pad 910. The fingerprint protection cover 860 protects the fingerprint module 820 from being damaged. The fingerprint sensor 870 is welded to the locking key 600, and the fingerprint sensor 870 acquires the capacitance value variations of the user fingerprints to implement scanning and identification of the fingerprint data of the user. The fingerprint circuit board 810 is connected to the main board 800, which is installed on the first housing, through a fingerprint circuit board connector 920. This allows the collected data to be transferred to a processor to implement recognition of the fingerprint data of the user.

This embodiment provides a housing assembly. In addition to the technical features of the foregoing embodiments, this embodiment further includes the following technical features.

As shown in FIGS. 1 to 8, the linkage assembly 300 includes a first connecting rod 310 and a second connecting rod 320; where one end of the first connecting rod 310 is rotationally connected to the hinge 200; and the second connecting rod 320 is rotationally connected to another end of the first connecting rod 310 and threaded through the bracket 410.

In this embodiment, one end of the first connecting rod 310 is rotationally connected to the hinge 200; and the second connecting rod 320 is rotationally connected to another end of the first connecting rod 310, making the linkage assembly 300 more flexible when the housing 100 is being opened or closed, and preventing the linkage assembly 300 from affecting the opening or closing of the housing 100.

Optionally, the first connecting rod 310 and the second connecting rod 320 are connected through a pin 330 and are rotatable around the pin 330.

Optionally, the first connecting rod 310 and the second connecting rod 320 are cylindrical in shape, and the side of the slider 420 in contact with the second connecting rod 320 is a curved surface, which matches the second connecting rod 320.

This embodiment provides a housing assembly. In addition to the technical features of the foregoing embodiments, this embodiment further includes the following technical features.

Figure 2:
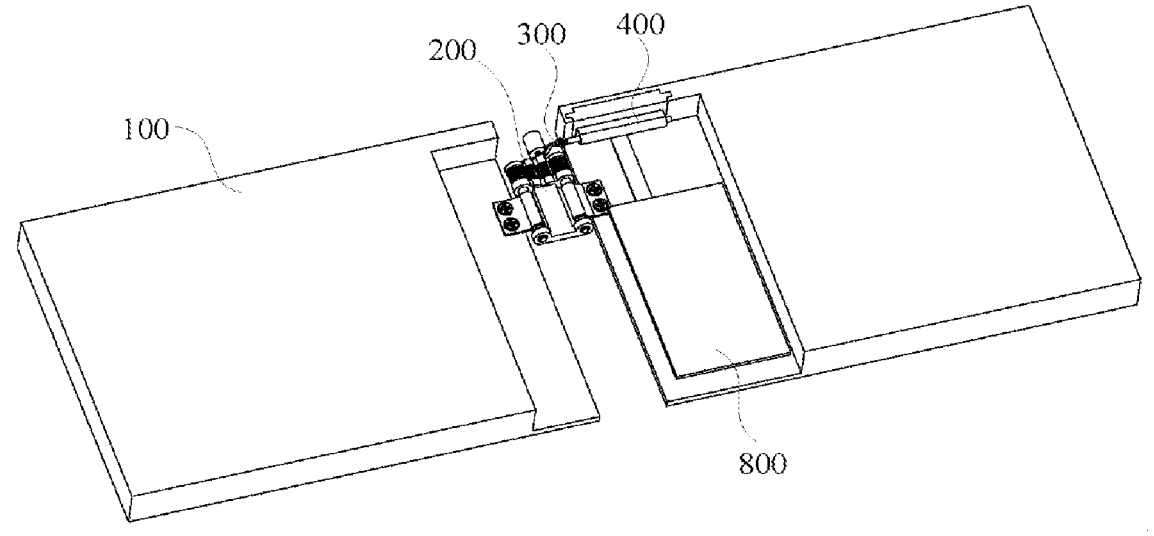
FIG. 2 is a second schematic structural diagram of a housing assembly according to an embodiment of this application.
Figure 3:
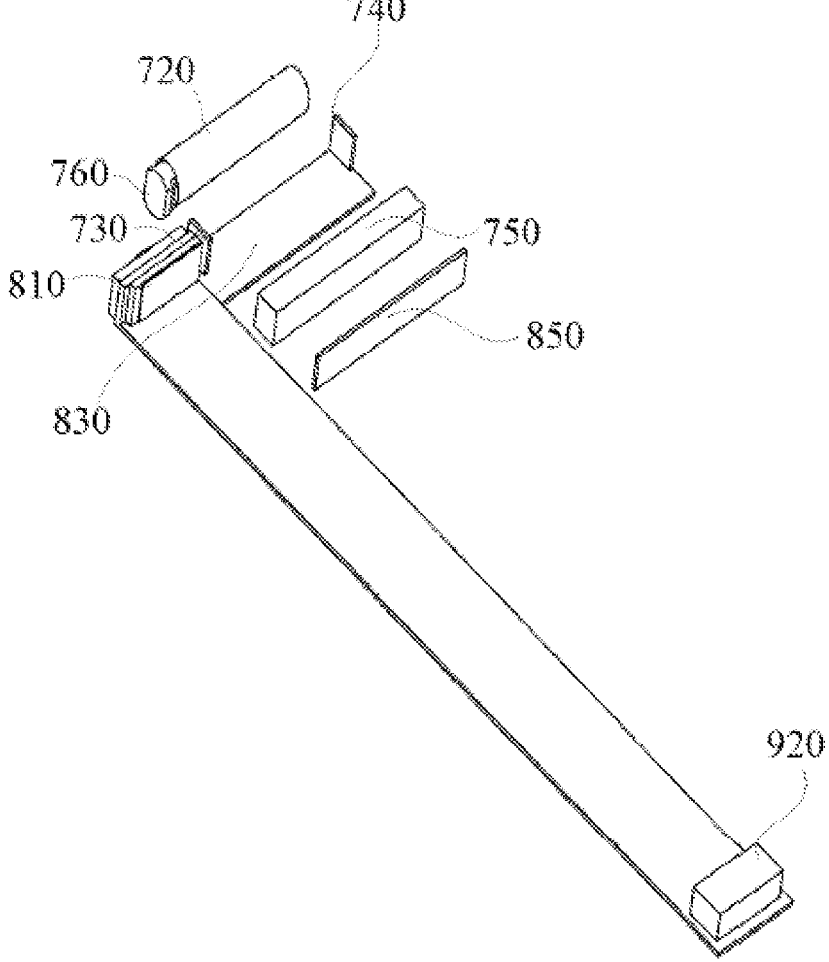
FIG. 3 is a schematic structural diagram of a driving assembly according to an embodiment of this application.
Figure 4:
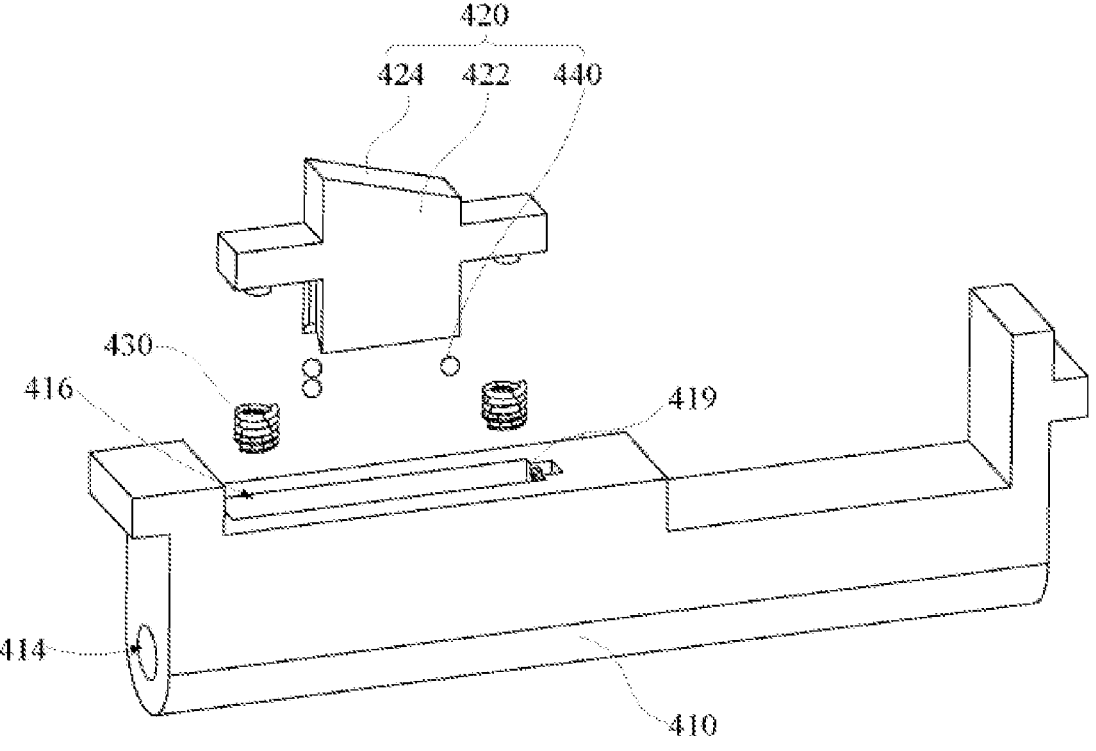
FIG. 4 is a schematic structural diagram of a bracket and a slider according to an embodiment of this application.
Figure 5:
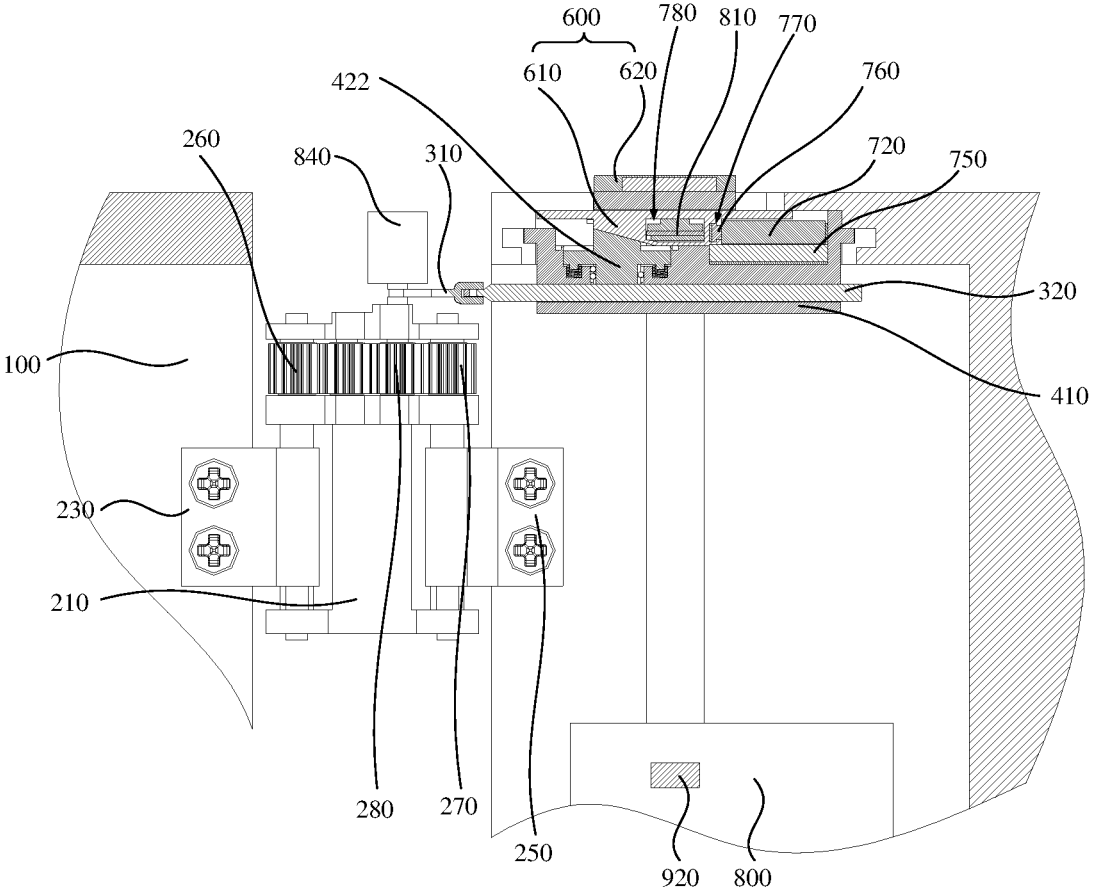
FIG. 5 is a partial schematic enlarged view of a housing assembly according to an embodiment of this application.
Figure 6:
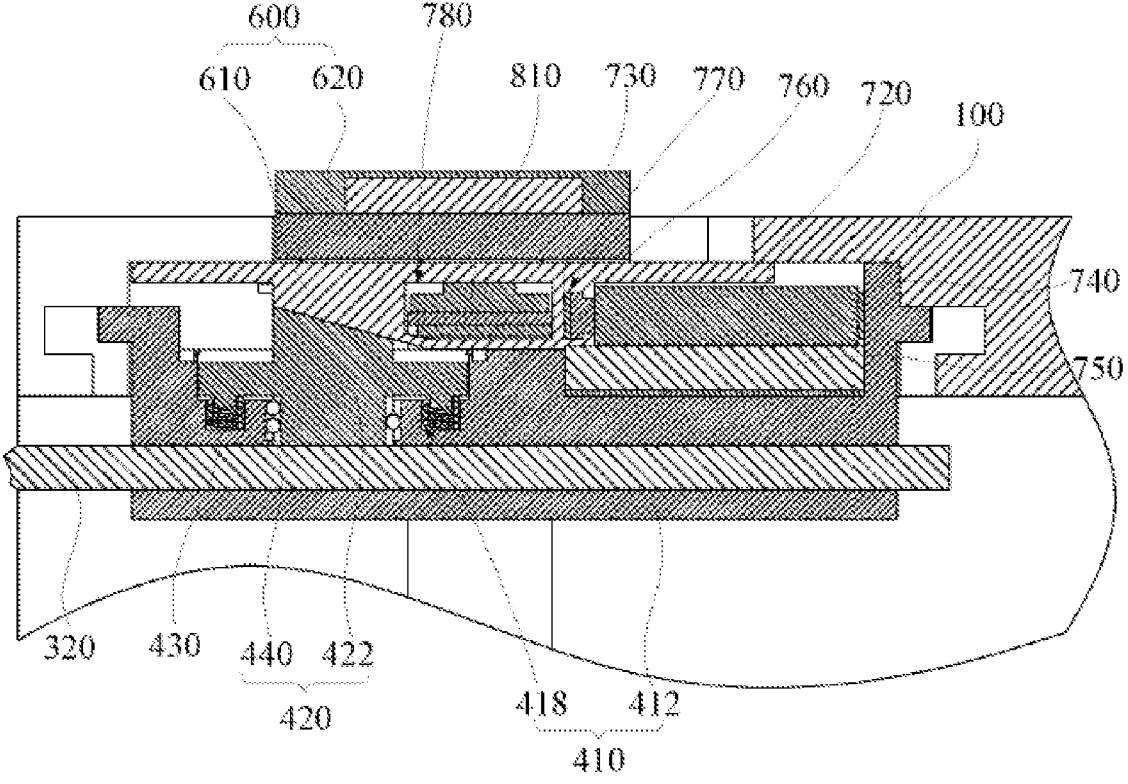
FIG. 6 is a schematic structural diagram of a locking assembly according to an embodiment of this application.
Figure 8:
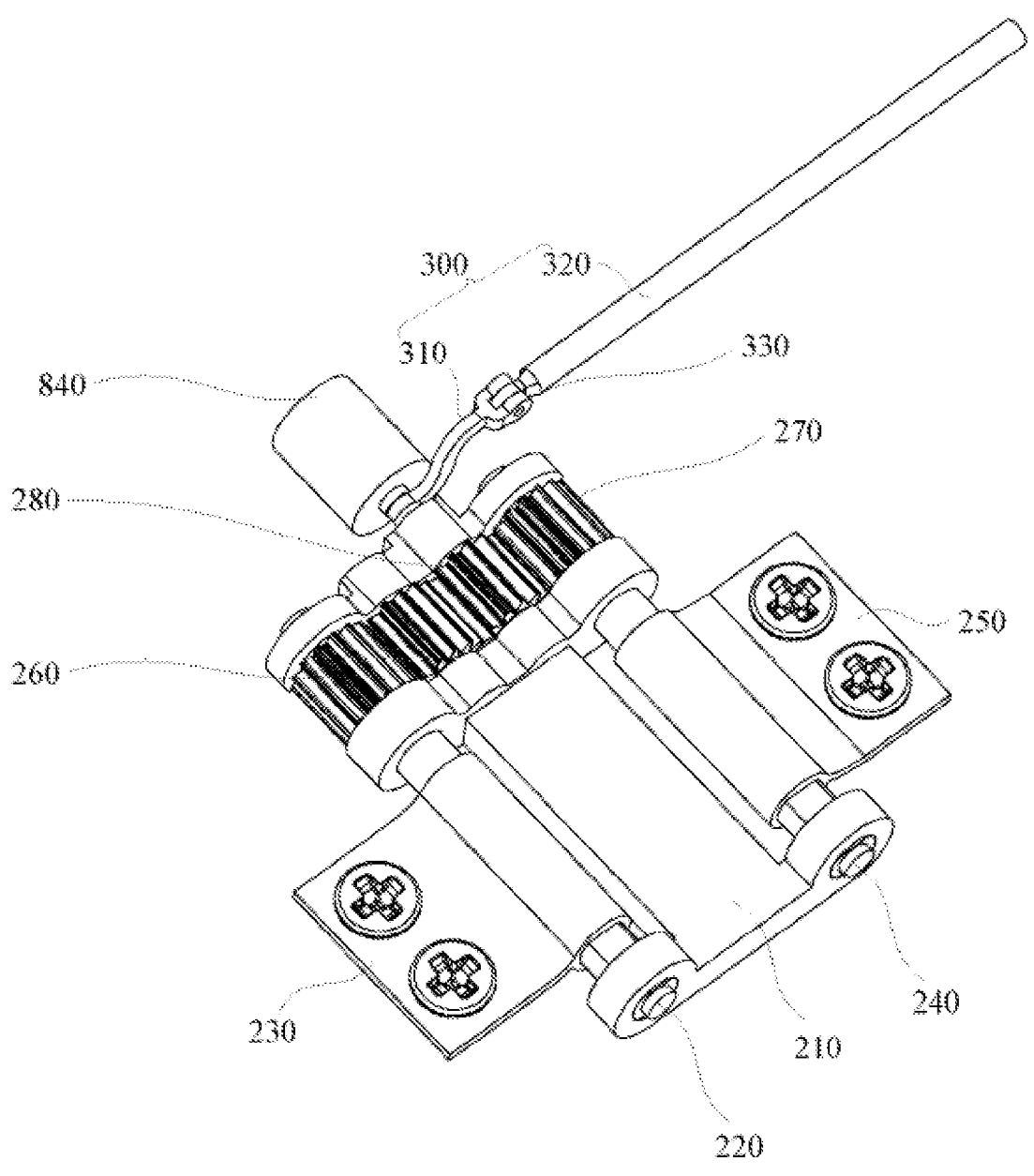
FIG. 8 is a schematic structural diagram of a hinge and a driving motor according to an embodiment of this application.

As shown in FIGS. 2 and 8, the hinge 200 includes a hinge body 210, a first connecting shaft 220, a first connecting portion 230, a second connecting shaft 240, a second connecting portion 250, a first gear 260, a second gear 270, a plurality of third gears 280, and a driving motor 840. The first connecting shaft 220 is threaded through the hinge body 210 and is located at one side of the hinge body 210. The first connecting portion 230 is sleeved on the first connecting shaft 220 and is connected to one of the at least two housings 100. The second connecting shaft 240 is threaded through the hinge body 210 and is located at another side of the hinge body 210. The second connecting portion 250 is sleeved on the second connecting shaft 240 and is connected to another one of the at least two housings 100. The first gear 260 is connected to the first connecting shaft 220. The second gear 270 is connected to the second connecting shaft 240. The plurality of third gears 280 are each engaged with the first gear 260 and the second gear 270. The driving motor 840 is connected to one of the plurality of third gears 280. The linkage assembly 300 is rotationally connected to one of the plurality of third gears 280.

Optionally, the driving motor 840 is connected to the first connecting rod 310 and can drive the first connecting rod 310 to perform circular motion and the second connecting rod 320 to perform linear motion within the sliding groove. The linkage assembly 300 drives the movement of the hinge 200, to drive the rotation of the housing 100.

In this embodiment, in this technical solution, the hinge 200 is connected to the at least two housings 100 via the first connecting shaft 220 and the second connecting shaft 240, respectively, enabling the at least two housings 100 to rotate more flexibly, which in turn makes it more convenient for the user to use the electronic device. Through the utilization of the first gear 260, the second gear 270, and the plurality of third gears 280, the first gear 260 is engaged with one of the plurality of third gears 280, the plurality of third gears 280 are engaged in turn, and then another third gear 280 in the plurality of third gears 280 is engaged with the second gear 270, enabling the first gear 260, the second gear 270, and the plurality of third gears 280 to rotate synchronously. The first gear 260 is connected to the first connecting shaft 220 and the second gear 270 is connected to the second connecting shaft 240, enabling the first connecting shaft 220 and the second connecting shaft 240 to rotate synchronously, which in turn enables the at least two housings 100 to rotate synchronously. The connection assembly can limit the opening angle between the housing 100 and the hinge 200, and the at least two housings 100 can rotate synchronously. Therefore, the connection assembly can limit the opening angle of the at least two housings 100, thereby enhancing the stability of the housing 100 after opening. In addition, the driving motor 840 is configured as connecting to one of the plurality of third gears 280 such that the driving motor 840 can drive the rotation of one of the plurality of third gears 280, thereby driving the rotation of the first gear 260 and the second gear 270, which in turn drives the rotation of the hinge 200. This achieves the electric opening and closing of the housings 100 on both sides, improving the convenience of the user during use and user experience.

Optionally, the first connecting portion 230 and the second connecting portion 250 are connected to the housing 100 by screws.

Optionally, the plurality of third gears 280 are in an even number to ensure that the first gear 260 and the second gear 270 rotate in the same direction.

An embodiment of this application further provides a housing assembly control method, including: controlling, based on operation information of a locking key 600, a driving assembly 710 to drive a locking assembly 400 to switch to a first state; controlling at least two housings 100 to move to a position corresponding to the operation information; and controlling the driving assembly 710 to drive the locking assembly 400 to switch to a second state.

In this embodiment, the housing assembly is provided with a driving assembly 710, and the driving assembly 710 is connected to the locking key 600. The driving assembly 710 can be controlled, based on the operation information of the locking key 600, to drive the locking key 600, which in turn drives the locking assembly 400 to switch between the first state and the second state, realizing electrical control of the state of the locking assembly 400. In this application, the state of the locking assembly 400 can be manually controlled using the locking key 600; or the driving assembly 710 can be used to drive the locking key 600, which in turn drives the locking assembly 400 to switch between states. This enhances flexibility in usage and improves the user experience on the electronic device.

The locking assembly 400 is provided on the housing 100 and can switch between a first state and a second state. In a case that the locking assembly 400 is in the first state, the housing 100 can freely rotate relative to the hinge 200. The housing assembly further includes a locking key 600, and the locking key 600 is provided on the housing 100 and in contact with the locking assembly 400. The locking key is configured to control the movement of the locking assembly 400, implementing control over the state of the locking assembly 400. In a case that the locking assembly 400 is in the second state, the locking assembly 400 abuts against the second end of the linkage assembly 300 and the second end of the linkage assembly 300 remains stationary relative to the first housing to fix the hinge 200 and maintain a specific angle between the first housing and the hinge 200.

This embodiment provides a housing assembly control method. In addition to the technical features of the foregoing embodiments, this embodiment further includes the following technical features.

The operation information includes a number of times that the locking key 600 is pressed, a position of the locking key 600, a movement state of the locking key 600, and/or a movement direction of the locking key 600.

In this embodiment, the operation information includes the number of times that the locking key 600 is pressed, the position of the locking key 600, and the movement state or movement direction of the locking key 600. The control system can control the driving assembly 710 to drive the locking assembly 400 to switch between the first state and the second state based on the operation information of the locking key 600. This enables automatic switching of the state of the locking component 400 through specific action control commands, enhancing use convenience and improving the user experience.

Optionally, the operation information may include a single-click, a double-click, a triple-click, or other pressing actions on the locking key 600; or may be sliding the locking key 600 to a specific position or sliding the locking key 600 to a specific direction.

An embodiment of this application further provides a housing assembly control system, including a first switching unit, a control unit, and a second switching unit. The control system is configured to, based on operation information of a locking key 600, control a driving assembly 710 to drive a locking assembly 400 to switch to a first state; control at least two housings 100 to move to a position corresponding to the operation information; and control the driving assembly 710 to drive the locking assembly 400 to switch to a second state.

In this embodiment, the housing assembly control system includes the first switching unit, the control unit, and the second switching unit. The housing assembly is provided with a driving assembly 710, and the driving assembly 710 is connected to the locking key 600. The driving assembly 710 can be controlled, based on the operation information of the locking key 600, to drive the locking key 600, which in turn drives the locking assembly 400 to switch between the first state and the second state, realizing electrical control of the state of the locking assembly 400. In this application, the state of the locking assembly 400 can be manually controlled using the locking key 600; or the driving assembly 710 can be used to drive the locking key 600, which in turn drives the locking assembly 400 to switch between states. This enhances flexibility in usage and improves the user experience on the electronic device.

The locking assembly 400 is provided on the housing 100 and can switch between a first state and a second state. In a case that the locking assembly 400 is in the first state, the housing 100 can freely rotate relative to the hinge 200. The housing assembly further includes a locking key 600, and the locking key 600 is provided on the housing 100 and in contact with the locking assembly 400. The locking key is configured to control the movement of the locking assembly 400, implementing control over the state of the locking assembly 400. In a case that the locking assembly 400 is in the second state, the locking assembly 400 abuts against the second end of the linkage assembly 300 and the second end of the linkage assembly 300 remains stationary relative to the first housing to fix the hinge 200 and maintain a specific angle between the first housing and the hinge 200.

An embodiment of this application further provides an electronic device. The electronic device includes the housing assembly according to any one of the foregoing embodiments; or the electronic device includes a memory and a processor, where the memory is configured to store executable instructions, and the processor is configured to execute stored instructions to implement the steps of the housing assembly control method according to any one of the foregoing embodiments.

In this embodiment, the electronic device provided in this application has all the beneficial effects of the housing assembly of any one of the foregoing embodiments as it includes the housing assembly. Details are not described herein again. Alternatively, the electronic device includes a memory and a processor, where the processor is capable of executing the instructions stored in the memory to implement the steps of the housing assembly control method of any one of the foregoing embodiments, and therefore has all the beneficial effects of the housing assembly control method. Details are not described herein again.

An embodiment of this application further provides an electronic device, configured to perform each process of the foregoing housing assembly control method embodiment, with the same technical effects achieved. To avoid repetition, details are not described herein.

An embodiment of this application further provides a non-transitory storage medium, where a computer program is stored and when the computer program is executed by a processor, the steps of the housing assembly control method according to any one of the foregoing embodiments are implemented.

In this embodiment, the non-transitory storage medium provided in this application is stored with a computer program and when the computer program is executed by a processor, the steps of the housing assembly control method according to any one of the foregoing embodiments are implemented. Therefore, the non-transitory storage medium has all the beneficial effects of the housing assembly control method. Details are not described herein again.

An embodiment of this application further provides a computer program product, and the computer program product may be executed by a processor to implement each process of the foregoing housing assembly control method embodiment, with the same technical effects achieved. To avoid repetition, details are not described herein.

In addition, an embodiment of this application provides a chip. The chip includes a processor and a communication interface. The communication interface is coupled to the processor. The processor is configured to run a program or instructions to implement each process of the foregoing housing assembly control method, with the same technical effect achieved. To avoid repetition, details are not described herein again.

In the claims, specification, and accompanying drawings of the specification of this application, the term "a plurality of" means two or more than two. Unless otherwise defined explicitly, the orientations or positional relationships indicated by the term "up" or "down" are based on the orientations or positional relationships as shown in the accompanying drawings. These terms are merely for ease and brevity of description of the embodiments of this application rather than indicating or implying that the apparatuses or components mentioned must have specific orientations as described or must be constructed or manipulated according to specific orientations, and therefore shall not be construed as any limitations on the embodiments of this application. The terms "connection", "mounting", and "fixing" should be understood in their general senses. For example, the "connection" may be a fixed connection between a plurality of objects, a detachable connection between a plurality of objects, or an integrated connection; or a direct connection between a plurality of objects, or an indirect connection between a plurality of objects through an intermediate medium. Persons of ordinary skill in the art can understand meanings of these terms in this application based on the context of the foregoing data.

In the claims, specification, and drawings of the specification of this application, descriptions of the terms "an embodiment", "some embodiments", or "a embodiment" mean the features, structures, materials or characteristics described with reference to the embodiment or example are included in at least one embodiment or example of this application. In the claims, specification, and drawings of the specification of this application, illustrative expressions of these terms do not necessarily refer to the same embodiment or example. Moreover, the features, structures, materials, or characteristics described may be combined in any suitable manners in any one or more embodiments or examples.

The above described are only some embodiments of this application that are not intended to limit this application. For those skilled in the art, this application may have various changes and variations. Any modification, equivalent replacement, or improvement made without departing from the spirit and principle of this application shall fall within the protection scope of this application.

What is claimed is:

1. A housing assembly, comprising:

at least two housings, wherein the at least two housings comprise a first housing;

a hinge, wherein the at least two housings are connected through the hinge, and the at least two housings are able to rotate relative to the hinge;

a linkage assembly, wherein a first end of the linkage assembly is connected to the hinge, and a second end of the linkage assembly extends into the first housing and is movably connected to the first housing;

a locking assembly, wherein the locking assembly is provided on the first housing and opposite the second end of the linkage assembly, the locking assembly having a first state and a second state, wherein in a case that the locking assembly is in the first state, the locking assembly is separated from the second end of the linkage assembly; and in a case that the locking assembly is in the second state, the locking assembly abuts against the second end of the linkage assembly;

a locking key, wherein the locking key is provided on the first housing and is in contact with the locking assembly; and a driving assembly, wherein the driving assembly is connected to the locking key to drive, through the locking key, the locking assembly to switch between the first state and the second state.

2. The housing assembly according to claim 1, wherein the driving assembly comprises:

a piezoelectric component, wherein a first end of the piezoelectric component is connected to the locking key;

a first electrode, wherein the first electrode is provided between the first end of the piezoelectric component and the locking key; and a second electrode, wherein the second electrode is provided at a second end of the piezoelectric component.

3. The housing assembly according to claim 2, wherein the driving assembly comprises:

a power storage component, wherein two poles of the power storage component are respectively connected to the first electrode and the second electrode.

4. The housing assembly according to claim 2, wherein the locking assembly further comprises:

a bracket, wherein the bracket is connected to the first housing; and a slider, wherein the slider is provided in the bracket and is able to slide relative to the bracket; wherein the second end of the linkage assembly is threaded through the bracket;

in the case that the locking assembly is in the first state, the slider is in a second position and is separated from the second end of the linkage assembly; and in the case that the locking assembly is in the second state, the slider is in a first position and abuts against the second end of the linkage assembly.

5. The housing assembly according to claim 4, wherein the slider comprises a slider body, one side of the slider body is able to abut against the linkage assembly, and another side of the slider body is provided with a first guiding surface, the first guiding surface being inclined relative to the linkage assembly.

6. The housing assembly according to claim 5, wherein the housing assembly further comprises:

a third sliding groove, wherein the third sliding groove is provided on one of the at least two housings, and the third sliding groove is provided from the slider to outside of one of the at least two housings in a cut-through manner; wherein the locking key is provided in the third sliding groove and is in contact with the first guiding surface, at least a portion of the locking key protrudes from an outer wall of one of the at least two housings, and the piezoelectric component is able to drive the locking key to slide in the third sliding groove, so as to drive the slider to move between the first position and the second position.

7. The housing assembly according to claim 6, wherein the locking key comprises:

a locking key body;

a toggle portion, wherein the toggle portion is provided at a first side of the locking key body and protrudes from the outer wall of one of the at least two housings; and a second guiding surface, wherein the second guiding surface is provided on a second side of the locking key body and matches the first guiding surface.

8. The housing assembly according to claim 7, wherein the driving assembly further comprises:

a clamping component, the clamping component being connected to the first end of the piezoelectric component; wherein the locking key body is provided with a clamping groove, and the clamping component is clamped in the clamping groove; and the first electrode is provided in the clamping groove and located between the clamping component and the locking key body.

9. The housing assembly according to claim 7, wherein the locking key body is provided with a mounting groove and the locking key further comprises:

a fingerprint circuit board, wherein the fingerprint circuit board is provided in the mounting groove; and a fingerprint module, wherein the fingerprint module is provided at the toggle portion and corresponds to the fingerprint circuit board.

10. The housing assembly according to claim 9, wherein the driving assembly further comprises:

a piezoelectric circuit board, wherein the piezoelectric circuit board is provided on the piezoelectric component and is electrically connected to the fingerprint circuit board.

11. The housing assembly according to claim 1, wherein the hinge comprises:

a hinge body;

a first connecting shaft, wherein the first connecting shaft is threaded through the hinge body and is located at one side of the hinge body;

a first connecting portion, wherein the first connecting portion is sleeved on the first connecting shaft and is connected to one of the at least two housings;

a second connecting shaft, wherein the second connecting shaft is threaded through the hinge body and is located at another side of the hinge body; and a second connecting portion, wherein the second connecting portion is sleeved on the second connecting shaft and is connected to another of the at least two housings.

12. The housing assembly according to claim 11, wherein the hinge further comprises:

a first gear, wherein the first gear is connected to the first connecting shaft;

a second gear, wherein the second gear is connected to the second connecting shaft;

a plurality of third gears, wherein the plurality of third gears are each engaged with the first gear and the second gear; and a driving motor, wherein the driving motor is connected to one of the plurality of third gears; and the linkage assembly is rotationally connected to one of the plurality of third gears.

13. An electronic device, comprising a housing assembly, wherein the housing assembly comprises:

at least two housings, wherein the at least two housings comprise a first housing;

a hinge, wherein the at least two housings are connected through the hinge, and the at least two housings are able to rotate relative to the hinge;

a linkage assembly, wherein a first end of the linkage assembly is connected to the hinge, and a second end of the linkage assembly extends into the first housing and is movably connected to the first housing;

a locking assembly, wherein the locking assembly is provided on the first housing and opposite the second end of the linkage assembly, the locking assembly having a first state and a second state, wherein in a case that the locking assembly is in the first state, the locking assembly is separated from the second end of the linkage assembly; and in a case that the locking assembly is in the second state, the locking assembly abuts against the second end of the linkage assembly;

a locking key, wherein the locking key is provided on the first housing and is in contact with the locking assembly; and a driving assembly, wherein the driving assembly is connected to the locking key to drive, through the locking key, the locking assembly to switch between the first state and the second state.

14. The electronic device according to claim 13, wherein the driving assembly comprises:

a piezoelectric component, wherein a first end of the piezoelectric component is connected to the locking key;

a first electrode, wherein the first electrode is provided between the first end of the piezoelectric component and the locking key; and a second electrode, wherein the second electrode is provided at a second end of the piezoelectric component.

15. The electronic device according to claim 14, wherein the driving assembly comprises:

a power storage component, wherein two poles of the power storage component are respectively connected to the first electrode and the second electrode.

16. The electronic device according to claim 14, wherein the locking assembly further comprises:

a bracket, wherein the bracket is connected to the first housing; and a slider, wherein the slider is provided in the bracket and is able to slide relative to the bracket; wherein the second end of the linkage assembly is threaded through the bracket;

in the case that the locking assembly is in the first state, the slider is in a second position and is separated from the second end of the linkage assembly; and in the case that the locking assembly is in the second state, the slider is in a first position and abuts against the second end of the linkage assembly.

17. The electronic device according to claim 16, wherein the slider comprises a slider body, one side of the slider body is able to abut against the linkage assembly, and another side of the slider body is provided with a first guiding surface, the first guiding surface being inclined relative to the linkage assembly.

18. The electronic device according to claim 17, wherein the housing assembly further comprises:

a third sliding groove, wherein the third sliding groove is provided on one of the at least two housings, and the third sliding groove is provided from the slider to outside of one of the at least two housings in a cut-through manner; wherein the locking key is provided in the third sliding groove and is in contact with the first guiding surface, at least a portion of the locking key protrudes from an outer wall of one of the at least two housings, and the piezoelectric component is able to drive the locking key to slide in the third sliding groove, so as to drive the slider to move between the first position and the second position.

19. The electronic device according to claim 18, wherein the locking key comprises:

a locking key body;

a toggle portion, wherein the toggle portion is provided at a first side of the locking key body and protrudes from the outer wall of one of the at least two housings; and a second guiding surface, wherein the second guiding surface is provided on a second side of the locking key body and matches the first guiding surface.

20. A housing assembly control method, performed by the electronic device according to claim 13 and comprising:

controlling, based on operation information of the locking key, the driving assembly to drive the locking assembly to switch to the first state;

controlling the at least two housings to move to a position corresponding to the operation information; and controlling the driving assembly to drive the locking assembly to switch to the second state.

\* \* \* \* \*